United States Patent [19]

Sorensen

[11] Patent Number: 4,971,747
[45] Date of Patent: Nov. 20, 1990

[54] HOLD PRESSURIZATION BY CONFINING RUNNER SYSTEMS OF ADJUSTABLE FEED SYSTEM IN MULTIPLE RECIPROCAL STACK MOLDING SYSTEM

[75] Inventor: Jens O. Sorensen, Rancho Santa Fe, Calif.

[73] Assignee: Primtec, Rancho Santa Fe, Calif.

[21] Appl. No.: 256,306

[22] Filed: Oct. 11, 1988

[51] Int. Cl.⁵ .................. B29C 45/32; B29C 45/38
[52] U.S. Cl. ........................ 264/297.2; 264/328.8; 264/328.11; 425/562; 425/572; 425/588; 425/589
[58] Field of Search ............. 264/297.2, 328.1, 328.8, 264/328.9, 328.11, 328.13, 328.19; 425/555, 557, 559, 561, 562, 572, 574, 581, 588, 589, 595

[56] References Cited

U.S. PATENT DOCUMENTS

| | | | |
|---|---|---|---|
| 3,049,757 | 8/1962 | Hagerborg | 425/593 |
| 3,417,433 | 11/1965 | Teraoka | |
| 3,707,342 | 12/1972 | Lohmann | |
| 3,709,644 | 1/1973 | Farrell | 425/160 |
| 3,847,525 | 11/1974 | Biefeldt et al. | 425/DIG. 229 |
| 4,242,073 | 12/1980 | Tsuchiya et al. | 425/149 |
| 4,400,341 | 8/1983 | Sorensen | 264/328.8 |
| 4,464,327 | 8/1984 | Sorensen | 264/328.8 |
| 4,539,171 | 9/1985 | Sorensen | 264/328.8 |
| 4,734,243 | 3/1988 | Kohama | 425/588 |
| 4,867,938 | 9/1989 | Schad et al. | 264/328.8 |

FOREIGN PATENT DOCUMENTS

| | | | |
|---|---|---|---|
| 103363 | 3/1984 | European Pat. Off. | 425/588 |
| 2187509 | 1/1974 | France | 425/588 |
| 50-5216 | 3/1975 | Japan | 425/588 |
| 58-166030 | 10/1983 | Japan | |
| 61-121912 | 6/1986 | Japan | 425/588 |
| 61-181623 | 8/1986 | Japan | 425/588 |
| 625461 | 9/1981 | Switzerland | |

OTHER PUBLICATIONS

Husky Injection Molding Systems "Industrial Container Molding Systems", 1988, pp. 14–17.

Mannesmann–Meer, "High–Capacity Injection Moulding Machines Reaktomat".

Primary Examiner—Jill L. Heitbrink
Attorney, Agent, or Firm—Edward W. Callan

[57] ABSTRACT

A system and method of cyclic injection molding a plastic material by controlling hold pressure and transferring plastic material to molding cavities of a stacked multi-parting injection molding system having desynchronized injection periods. The system includes left, left center, center, right center and right molding blocks disposed for movement with respect to each other along a common axis; and defining a left molding cavity between the left and the left center molding blocks, a left center molding cavity between the left center and the center molding blocks, a right center molding cavity between the center and the right center molding blocks, and a right molding cavity between the right center and the right molding blocks. The left center and right center molding blocks each contain a bifurcated runner system, confining means for confining injected plastic material therein, hold pressurizing means for hold pressurizing the confined injected plastic material in the bifurcated runner system and an inlet orifice, for feeding the adjacent molding cavities. The system further includes a clamping unit for moving axially the left molding block in relation to the right molding block and providing collective axial clamping force on the left, left center, right center and right molding cavities; a left locking system for maintaining the left and left center molding cavities in a closed position when the right center and right molding cavities in an open position; a right locking system for maintaining the right center and right molding cavities in a closed position when the left and left center and right molding cavities in a closed position when the left and left center molding cavities are in an open position; and an adjustable feed system encompassed by a combination of the left center and the right center molding blocks and a plasticizing system which has one or more outlet orifices.

22 Claims, 2 Drawing Sheets

HOLD PRESSURIZATION BY CONFINING RUNNER SYSTEMS OF ADJUSTABLE FEED SYSTEM IN MULTIPLE RECIPROCAL STACK MOLDING SYSTEM

BACKGROUND OF THE INVENTION

The present invention generally pertains to injection molding systems and methods and is particularly directed to hold pressure control and plastic material transfer in a stacked multi-parting injection molding system having desynchronized injection periods.

Stacked multi-parting injection molding system having desynchronized injection periods are described in U.S. Pat. Nos. 4,400,341; 4,464,327 and 4,539,171 to Jens Ole Sorensen, the named inventor herein. U.S. Pat. No. 4,400,341 teaches that the desynchronous operation of a reciprocal stacked molding system can be twice as fast as the operation of a single mold provided that the cooling time (C) is greater than or equal to the sum of time (I) during which the plastic material is injected, the time (E) during which the molded product is ejected, and the time (HP) during which hold pressure is applied.

$$C \geq I + E + HP \qquad (Eq. 1)$$

In a stacked multi-parting injection molding system in which left, left center, center, right center and right molding blocks are disposed for movement with respect to each other along a common axis, it may not be possible to meet this condition when the hold pressure time is substantial.

SUMMARY OF THE INVENTION

The present invention solves this problem by providing a reciprocal stacked multi-parting injection molding system with a confined feed system, in which left, left center, center, right center and right molding blocks are disposed for movement with respect to each other along a common axis, that can be operated desynchronously twice as fast as the operation of a conventional synchronously operated stack mold, provided that the cooling time is greater than or equal to the sum of time (I) during which the plastic material is injected and the time (E) during which the molded product is ejected minus the time (HP) during which hold pressure is applied, or $$C \geq I + E - HP \qquad (Eq\ 2)$$

Accordingly, the cooling time (C) need not be as long as in the prior art system, and much faster operation may be realized even when the hold pressure time (HP) is substantial.

The present invention provides a method of cyclic injection molding a plastic material by controlling hold pressure and transferring plastic material to molding cavities of a stacked multi-parting injection molding system having desynchronized injection periods, including left, left center, center, right center and right molding blocks disposed for movement with respect to each other along a common axis; and defining a left molding cavity between the left and the left center molding blocks, a left center molding cavity between the left center and the center molding blocks, a right center molding cavity between the center and the right center molding blocks, and a right molding cavity between the right center and the right molding blocks; which in the left center molding block comprises a left runner system with left confining means for confining injected plastic material in the left runner system, and with a left inlet orifice, for feeding the left and left center molding cavities and which in the right center molding block comprises a right runner system with right confining means for confining injected plastic material in the right runner system, and with a right inlet orifice, for feeding the right center and right molding cavities, and a clamping unit for moving axially the left molding block in relation to the right molding block and providing collective axial clamping force on the left, left center, right center and right molding cavities, a left locking system for maintaining the left and left center molding cavities in a closed position when the right center and right molding cavities are in an open position and a right locking system for maintaining the right center and right molding cavities in a closed position when the left and left center molding cavities are in an open position, and an adjustable feed system encompassed by a combination of the left center and the right center blocks and a system which has one or more outlet orifices. The method includes the following cyclic steps:

a. moving the left and right molding blocks toward each other by relative axial movement to provide collective axial clamping force on the left, left center, right center and right molding cavities, thereby positioning the left runner orifice in a predetermined left contact position;

b. applying the left locking system;

c. adjusting the feed system to enable plastic material to be fed from the plasticizing system through the left runner system to the left and left center molding cavities;

d. pressurizing the plasticizing system to inject plastic material into the left and left center molding cavities via the left runner system;

e. confining the plastic material injected into the left runner system and the left and left center molding cavities;

f. holdpressurizing the plastic material confined in the left runner system and the left and left center molding cavities;

g. withdrawing the left and right molding blocks from each other to open the right center and right molding cavities and eject molded products therefrom;

h. moving the left and right molding blocks toward each other by relative axial movement to provide collective axial clamping force on the left, left center, right center and right molding cavities, thereby positioning the right runner orifice in a predetermined right contact position;

i. applying the right locking system;

j. adjusting the feed system to enable plastic material to be fed from the plasticizing system through the right runner system to the right center and right molding cavities;

k. pressurizing the plasticizing system to inject plastic material into the right center and right molding cavities via the right runner system;

l. confining the plastic material injected into the right runner system and the right center and right molding cavities;

m. holdpressurizing the plastic material confined in the right runner system and the right center and right molding cavities;

n. withdrawing the left and right molding blocks from each other to open the left center and left molding cavities and eject molded products therefrom.

The present invention further includes a stacked multi-parting injection molding system having desynchronized injection periods, that is adapted for cyclic injection molding a plastic material by controlling hold pressure and adjusting the feed system to transfer plastic material to the molding cavities in accordance with the above-described method.

With the system and method of the present invention, it is not necessary to fill all of the molding cavities at the same time, whereby balancing problems and uneven power demands are alleviated.

Additional features of the present invention are described in relation to the description of the preferred embodiments.

DESCRIPTION OF THE PREFERRED EMBODIMENTS

Figure 1:
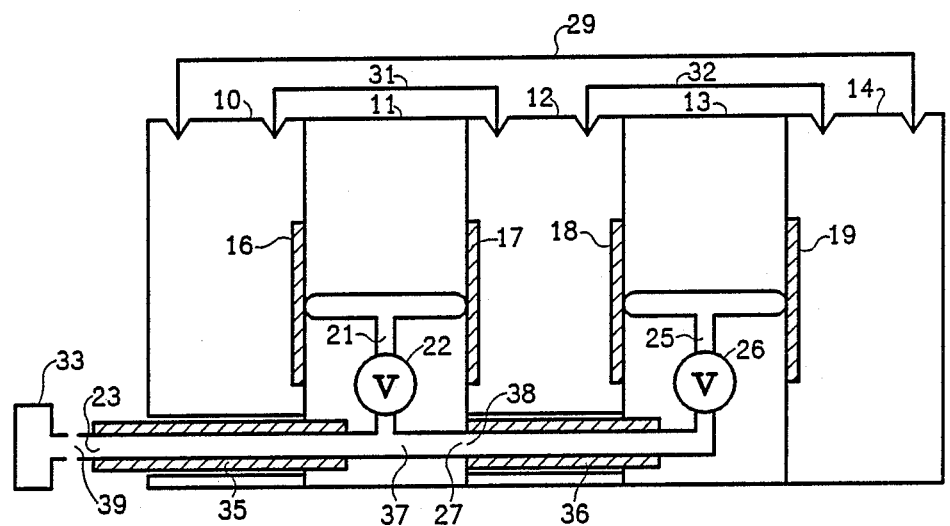
FIG. 1 is a diagram of a first preferred embodiment of the system of the present invention.

Referring to FIG. 1, a first preferred embodiment of the system of the stacked multi-parting injection molding system of the present invention includes a left molding block 10, a left center molding block 11, a center molding block 12, a right center molding block 13 and a right molding block 14, which are disposed for movement with respect to each other along a common axis. A left molding cavity 16 is defined between the left molding block 10 and the left center molding block 11. A left center molding cavity 17 is defined between the left center molding block 11 and the center molding block 12. A right center molding cavity 18 is defined between the center molding block 12 and the right center molding block 13. A right molding cavity is defined between the right center molding block 13 and the right molding blocks 14.

The left center molding block 11 contains a left bifurcated runner system 21 for feeding injected plastic material to the left molding cavity 16 and the left center molding cavity 17. A valve 22 within the left runner system 21 may be operated to confine injected plastic material within that portion of the left runner system 21 that communicates directly with the left molding cavity 16 and the left center molding cavity 17. The left runner system 21 has a left inlet orifice 23.

The right center molding block 13 contains a right bifurcated runner system 25 for feeding injected plastic material to the right molding cavity 19 and the right center molding cavity 18. A valve 26 within the right runner system 25 may be operated to confine injected plastic material within that portion of the right runner system 25 that communicates directly with the right center molding cavity 18 and the right molding cavity 19. The right runner system 25 has a right inlet orifice 27.

The molding system of FIG. 1 further contains a clamping unit 29, a left locking system 31, a right locking system 32, a plasticizing system 33, a first snorkle 35 and a second snorkle 36.

The clamping unit 29 is operated to move the left molding block 10 axially in relation to the right molding block 14 to provide collective axial clamping force on the left molding cavity 16, the left center molding cavity 17, the right center molding cavity 18 and the right molding cavity 19.

The left locking system 31 is applied to maintain the left molding cavity 16 and the left center molding cavity 17 in closed positions when the right center molding cavity 18 and right molding cavity 19 are in open positions.

The right locking system 32 is applied to maintain the right molding cavity 19 and the right center molding cavity 18 in closed positions when the left center molding cavity 17 and left molding cavity 16 are in open positions.

An adjustable feed system in the molding system of FIG. 1 is encompassed by a combination of the molding blocks 10, 11, 12, 13, the plasticizing system 33 and the snorkel 35, 36. The first snorkle 35 is integral to the left center molding block 11 and passes through an opening in the left molding block 10. The second snorkle 36 is integral to the right center molding block 13 and passes through an opening in the center molding block 12. The left center molding block 11 contains a channel 37 that couples the first snorkle 35 to the second snorkle 36 when the left molding cavity 16, the left center molding cavity 17 and the right center molding cavity 18 are all closed. The channel 37 has an outlet orifice 38 that is coupled to the right inlet orifice 27 of the right runner system 25 by the second snorkle 36 when the left center and right center molding cavities 17, 18 are both closed.

Injected plastic material is fed from an outlet orifice 39 of the plasticizing system 33 to the left bifurcated runner system 21 via the inlet orifice 23 and the first snorkle 35. Injected plastic material is fed from the outlet orifice 39 of the plasticizing system 33 to the right bifurcated runner system 25 via the inlet orifice 23 the first snorkle 35, the channel 37, the right inlet orifice 27 and the second snorkle 36.

In accordance with the hold pressure control and plastic material transfer method of the present invention, the stacked multi-parting injection molding system of FIG. 1 is operated as follows.

The left molding block 10 and the right molding block 14 are moved toward each other by relative axial movement to provide collective axial clamping force on the left molding cavity 16, the left center molding cavity 17, the right center molding cavity 18 and the right molding cavity 19, to thereby position the left runner orifice 23 in a predetermined left contact position as shown in FIG. 1.

The left locking system 31 is applied to lock the left molding cavity 16 and the left center molding cavity 17 in closed positions, as shown in FIG. 1.

The feed system is adjusted to enable plastic material to be fed from the plasticizing system 33 through the left runner system 21 to the left and left center molding cavities 16, 17. The plasticizing system 33 is held against the left molding block 10 so that its outlet orifice 39 contacts and seals against the snorkle 35 so as to be coupled to the left inlet orifice 23 of the left runner system 21 at the left contact position shown in FIG. 1.

The plasticizing system 33 is pressurized to inject plastic material into the left molding cavity 16 and the left center molding cavity 17 via the first snorkle 35 and the left runner system 21.

The valve 22 is closed to confine the pressurized plastic material injected into the left runner system 21 and the left and left center molding cavities 16, 17 and thereby holdpressurize the plastic material confined in the left runner system 21 and the left and left center molding cavities 16, 17.

The left and right molding blocks 10, 14 are withdrawn from each other to open the right center and right molding cavities 18, 19 and eject molded products therefrom.

The left and right molding blocks 10, 14 are moved toward each other by relative axial movement to provide collective axial clamping force on the left molding cavity 16, the left center molding cavity 17, the right center molding cavity 18 and the right molding cavity 19, to thereby position the right runner orifice 27 in a predetermined left contact position as shown in FIG. 1, wherein the outlet orifice 38 of the center molding block channel 37 contacts and seals against the second snorkle 36 so as to be coupled to the right inlet orifice 27 of the right runner system 25 at the right contact position shown in FIG. 1.

The right locking system 32 is applied to lock the right molding cavity 19 and the right center molding cavity 18 in closed positions, as shown in FIG. 1.

The feed system is adjusted to enable plastic material to be fed from the plasticizing system 33 through the right runner system 25 to the right and right center molding cavities 19, 18.

The plasticizing system 33 is pressurized to inject plastic material into the right molding cavity 19 and the right center molding cavity 18 via the first snorkle 35, the channel 37, the second snorkle 36 and the right runner system 25.

The valve 26 is closed to confine the pressurized plastic material injected into the right runner system 25 and the right and right center molding cavities 19, 18 and thereby holdpressurize the plastic material confined in the right runner system 25 and the right and right center molding cavities 19, 18.

The left and right molding blocks 10, 14 are withdrawn from each other to open the left center and left molding cavities 16, 17 and eject molded products therefrom.

Figure 2:
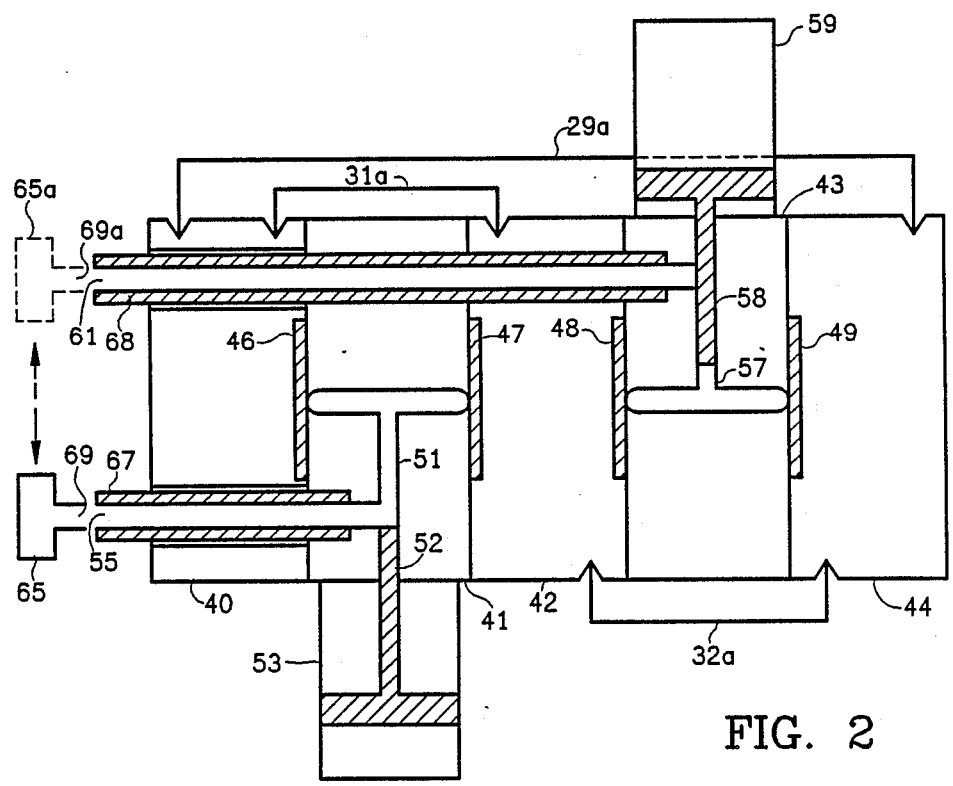
FIG. 2 is a diagram of a second preferred embodiment of the system of the present invention.

Referring to FIG. 2, a second preferred embodiment of the system of the stacked multi-parting injection molding system of the present invention includes a left molding block 40, a left center molding block 41, a center molding block 42, a right center molding block 43 and a right molding block 44, which are disposed for movement with respect to each other along a common axis. A left molding cavity 46 is defined between the left molding block 40 and the left center molding block 41. A left center molding cavity 47 is defined between the left center molding block 41 and the center molding block 42. A right center molding cavity 48 is defined between the center molding block 42 and the right center molding block 43. A right molding cavity is defined between the right center molding block 43 and the right molding blocks 44.

The left center molding block 41 contains a left bifurcated runner system 51 for feeding injected plastic material to the left molding cavity 46 and the left center molding cavity 47. A left packing element 52 positioned within the left runner system 51 may be moved in response to operation of a piston device 53 to confine injected plastic material within that portion of the left runner system 51 that communicates directly with the left molding cavity 46 and the left center molding cavity 47 and thereby holdpressurize such confined plastic material. The left runner system 51 has a left inlet orifice 55.

The right center molding block 43 contains a right bifurcated runner system 57 for feeding injected plastic material to the right molding cavity 49 and the right center molding cavity 48. A right packing element 58 positioned within the right runner system 57 may be moved in response to operation of a piston device 59 to confine injected plastic material within that portion of the right runner system 57 that communicates directly with the right center molding cavity 48 and the right molding cavity 49 and thereby holdpressurize such confined plastic material. The right runner system 57 has a right inlet orifice 61.

The molding system of FIG. 2 further contains a clamping unit 29a, a left locking system 31a and a right locking system 32a, such as the clamping unit 29, the left locking system 31 and the right locking system 32 in the system of FIG. 1. The system of FIG. 2 further includes a plasticizing system 65, a first snorkle 67 and a second snorkle 68.

The clamping unit 29a is operated to move the left molding block 40 axially in relation to the right molding block 44 to provide collective axial clamping force on the left molding cavity 46, the left center molding cavity 47, the right center molding cavity 48 and the right molding cavity 49.

The left locking system 31a is applied to maintain the left molding cavity 46 and the left center molding cavity 47 in closed positions when the right center molding cavity 48 and right molding cavity 49 are in open positions.

The right locking system 32a is applied to maintain the right molding cavity 49 and the right center molding cavity 48 in closed positions when the left center molding cavity 47 and left molding cavity 46 are in open positions.

An adjustable feed system in the molding system of FIG. 2 is encompassed by a combination of the molding blocks 40, 41, 42, 43, the plasticizing system 65 and the snorkels 67, 68. The first snorkle 67 is integral to the left center molding block 41 and passes through an opening in the left molding block 40. The second snorkle 68 is integral to the right center molding block 43 and passes through an opening in the left, left center and center molding blocks 40, 41, 42.

The plasticizing system 65 has a single outlet orifice 69. The plasticizing system 65 is movable between a first position (shown with solid lines) where it's outlet orifice 69 is coupled to the left runner system 51 by the left inlet orifice 55 and the first snorkle 67, and a second position (65a shown in dashed lines lines) where it's outlet orifice 69a is coupled to the right runner system 57 by the right inlet orifice 61 and the second snorkle 68.

Injected plastic material is fed from the outlet orifice 69 of the plasticizing system 65 to the left bifurcated runner system 51 via the left inlet orifice 55 and the first snorkle 67. Injected plastic material is fed from the outlet orifice 69 of the plasticizing system 65 to the right bifurcated runner system 57 via the right inlet orifice 61 and the second snorkle 68.

In accordance with the hold pressure control and plastic material transfer method of the present invention, the stacked multi-parting injection molding system of FIG. 2 is operated as follows.

The left molding block 40 and the right molding block 44 are moved toward each other by relative axial movement to provide collective axial clamping force on the left molding cavity 46, the left center molding cavity 47, the right center molding cavity 48 and the right molding cavity 49, to thereby position the left runner orifice 55 in a predetermined left contact position as shown in FIG. 2.

The left locking system 31a is applied to lock the left molding cavity 46 and the left center molding cavity 47 in closed positions, as shown in FIG. 2.

The feed system is adjusted to enable plastic material to be fed from the plasticizing system 65 through the left runner system 51 to the left and left center molding cavities 46, 47.

The plasticizing system 65 is pressurized to inject plastic material into the left molding cavity 46 and the left center molding cavity 47 via the first snorkle 67 and the left runner system 51.

The left packing element 52 is moved to confine the pressurized plastic material injected into the left runner system 51 and the left and left center molding cavities 46, 47 and thereby holdpressurize the plastic material confined in the left runner system 51 and the left and left center molding cavities 46, 47. The left packing element 52 is moved again to further holdpressurize such plastic material as such plastic material cools. Subsequently, the left packing element 52 is moved to depressurize the plastic material confined in the left runner system 51.

The left and right molding blocks 40, 44 are then withdrawn from each other to open the right center and right molding cavities 48, 49 and eject molded products therefrom.

The left and right molding blocks 40, 44 are moved toward each other by relative axial movement to provide collective axial clamping force on the left molding cavity 16, the left center molding cavity 47, the right center molding cavity 48 and the right molding cavity 49, to thereby position the right runner orifice 61 in a predetermined right contact position as shown in FIG. 2.

The right locking system 32a is applied to lock the right molding cavity 49 and the right center molding cavity 48 in closed positions, as shown in FIG. 2.

The feed system is adjusted to enable plastic material to be fed from the plasticizing system 65 through the right runner system 57 to the right and right center molding cavities 49, 48.

The plasticizing system 65 is pressurized to inject plastic material into the right molding cavity 49 and the right center molding cavity 48 via the second snorkle 36 and the right runner system 57.

The right packing element 58 is moved to confine the pressurized plastic material injected into the right runner system 57 and the right and right center molding cavities 49, 48 and thereby holdpressurize the plastic material confined in the right runner system 57 and the right and right center molding cavities 49, 48. The right packing element 58 is moved again to further holdpressurize such plastic material as such plastic material cools. Subsequently, the left packing element 58 is moved to depressurize the plastic material confined in the right runner system 57.

The left and right molding blocks 40, 44 are then withdrawn from each other to open the left center and left molding cavities 46, 47 and eject molded products therefrom.

Alternatively, the plasticizing system includes two separate plasticizing units a left plasticizing unit 65 and a right plasticizing unit 65a. The left plasticizing unit 65 has a left outlet orifice 69. The right plasticizing unit 65a has a right outlet orifice 69a.

Injected plastic material is fed from the left outlet orifice 69 of the left plasticizing system 65 to the left bifurcated runner system 51 via the left inlet orifice 55 and the first snorkle 67. Injected plastic material is fed from the right outlet orifice 69a of the right plasticizing system 65a to the right bifurcated runner system 57 via the right inlet orifice 61 and the second snorkle 68.

Figure 3:
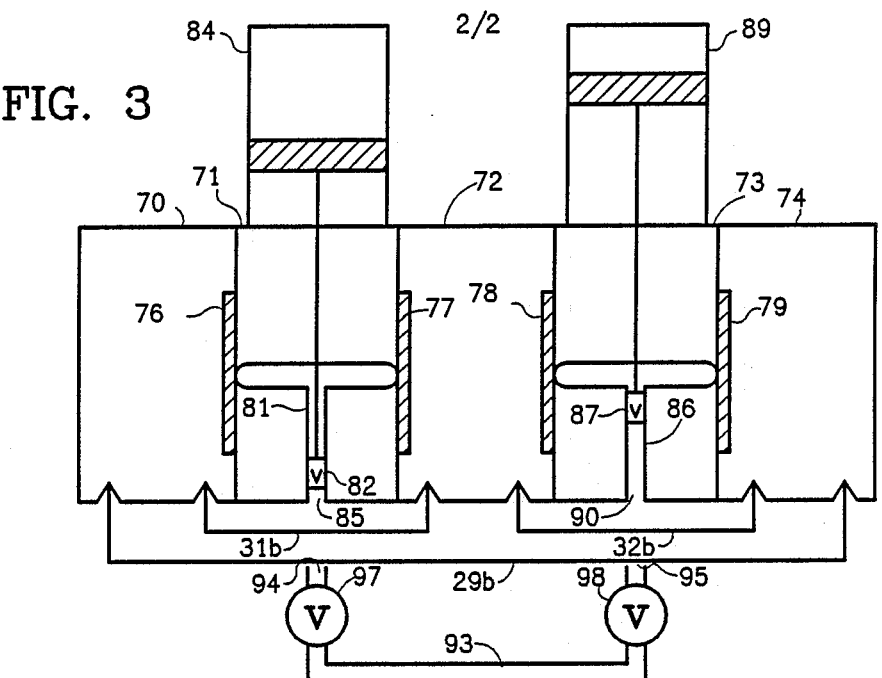
FIG. 3 is a diagram of a third preferred embodiment of the system of the present invention.

Referring to FIG. 3, a third preferred embodiment of the system of the stacked multi-parting injection molding system of the present invention includes a left molding block 70, a left center molding block 71, a center molding block 72, a right center molding block 73 and a right molding block 74, which are disposed for movement with respect to each other along a common axis. A left molding cavity 76 is defined between the left molding block 70 and the left center molding block 71. A left center molding cavity 77 is defined between the left center molding block 71 and the center molding block 72. A right center molding cavity 78 is defined between the center molding block 72 and the right center molding block 73. A right molding cavity is defined between the right center molding block 73 and the right molding blocks 74.

The left center molding block 71 contains a left bifurcated runner system 81 for feeding injected plastic material to the left molding cavity 76 and the left center molding cavity 77. A left packing element 82 containing a one-way valve is positioned within the left runner system 81 to confine injected plastic material within that portion of the left runner system 81 that communicates directly with the left molding cavity 76 and the left center molding cavity 77. The left packing element 82 may be moved in response to operation of a piston device 84 to hold pressurize the plastic material confined in the left runner system 81 and left and left center molding cavities 76, 77. The left runner system 81 has a left inlet orifice 85.

The right center molding block 73 contains a right bifurcated runner system 86 for feeding injected plastic material to the right molding cavity 79 and the right center molding cavity 78. A right packing element 87 containing a one-way valve is positioned within the right runner system 86 to confine injected plastic material within that portion of the right runner system 86 that communicates directly with the left molding cavity 76 and the left center molding cavity 77. The right packing element 87 may be moved in response to operation of a piston device 88 to hold pressurize the plastic material confined in the right runner system 86 and the right and right center molding cavities 79, 78. The right runner system 86 has a left inlet orifice 90.

The molding system of FIG. 3 further contains a clamping unit 29b, a left locking system 31b and a right locking system 32b, such as the clamping unit 29, the left locking system 31 and the right locking system 32 in the system of FIG. 1.

The molding system of FIG. 3 also contains a plasticizing system 92 including a bifurcated feed system 93 terminating in left outlet orifice 94 and a right outlet orifice 95. A left valve 97 is positioned in the left branch of the bifurcated feed system adjacent the left outlet orifice 94; and a right valve 98 is positioned in the right branch of the bifurcated feed system adjacent the right outlet orifice 95.

The clamping unit 29b is operated to move the left molding block 70 axially in relation to the right molding block 74 to provide collective axial clamping force on the left molding cavity 76, the left center molding cavity 77, the right center molding cavity 78 and the right molding cavity 79.

The left locking system 31b is applied to maintain the left molding cavity 76 and the left center molding cavity 77 in closed positions when the right center molding cavity 78 and right molding cavity 79 are in open positions.

The right locking system 32b is applied to maintain the right molding cavity 79 and the right center molding cavity 78 in closed positions when the left center molding cavity 77 and left molding cavity 76 are in open positions.

An adjustable feed system in the molding system of FIG. 3 is encompassed by a combination of the molding blocks 71, 72, 73, the plasticizing system 92 including the bifurcated feed system 93.

Injected plastic material is fed from the left outlet orifice 94 of the bifurcated feed system 93 to the inlet orifice 85 of the left bifurcated runner system 81 injected plastic material is fed from the right outlet orifice 95 of the bifurcated feed system 93 to the right inlet orifice 90 of the right bifurcated runner system 86.

In accordance with the hold pressure control and plastic material transfer method of the present invention, the stacked multi-parting injection molding system of FIG. 3 is operated as follows.

The left molding block 70 and the right molding block 74 are moved toward each other by relative axial movement to provide collective axial clamping force on the left molding cavity 76, the left center molding cavity 77, the right center molding cavity 78 and the right molding cavity 79, to thereby position the left runner inlet orifice 85 in a predetermined left contact position as shown in FIG. 3.

The left locking system 31b is applied to lock the left molding cavity 76 and the left center molding cavity 77 in closed positions, as shown in FIG. 3.

The feed system is adjusted to enable plastic material to be fed from the plasticizing system 92 through the left runner system 81 to the left and left center molding cavities 76, 77 by holding the left outlet orifice 94 against the inlet orifice 85 of the left runner system 81 so that the left outlet orifice 94 contacts and seals against the left inlet orifice 85 in the left contact position shown in FIG. 3.

The valve 97 is opened and the plasticizing system 92 is pressurized to inject plastic material into the left molding cavity 76 and the left center molding cavity 77, via the left runner system 81.

The left packing element 82 is closed to holdpressurize the plastic material confined in the left runner system 81 and the left and left center molding cavities 76, 77. The left packing element 82 is moved to further holdpressurize such plastic material as such plastic material cools. Subsequently, the left packing element 82 is moved to depressurize the plastic material confined in the left runner system 81.

The left and right molding blocks 70, 74 are then withdrawn from each other to open the right center and right molding cavities 78, 79 and eject molded products therefrom.

The left and right molding blocks 70, 74 are moved toward each other by relative axial movement to provide collective axial clamping force on the left molding cavity 76, the left center molding cavity 77, the right center molding cavity 78 and the right molding cavity 79, to thereby position the right runner inlet orifice 90 in a predetermined right contact position as shown in FIG. 3.

The right locking system 32b is applied to lock the right molding cavity 79 and the right center molding cavity 78 in closed positions, as shown in FIG. 3.

The feed system is adjusted to enable plastic material to be fed from the plasticizing system 92 through the right runner system 86 to the right and right center molding cavities 79, 78 by holding the right outlet orifice 95 against the inlet orifice 90 of the right runner system 86 so that the right outlet orifice 95 contacts and seals against the right inlet orifice 90 in the right contact position shown in FIG. 3.

The valve 98 is opened and the plasticizing system 92 is pressurized to inject plastic material into the right molding cavity 79 and the right center molding cavity 78, via the right runner system 86.

The right packing element 87 is closed to holdpressurize the plastic material confined in the right runner system 86 and the right and right center molding cavities 79, 78. The right packing element 87 is moved to further holdpressurize such plastic material as such plastic material cools. Subsequently, the right packing element 87 is moved to depressurize the plastic material confined in the right runner system 86.

The left and right molding blocks 70, 74 are then withdrawn from each other to open the left center and left molding cavities 76, 77 and eject molded products therefrom.

Figure 4:
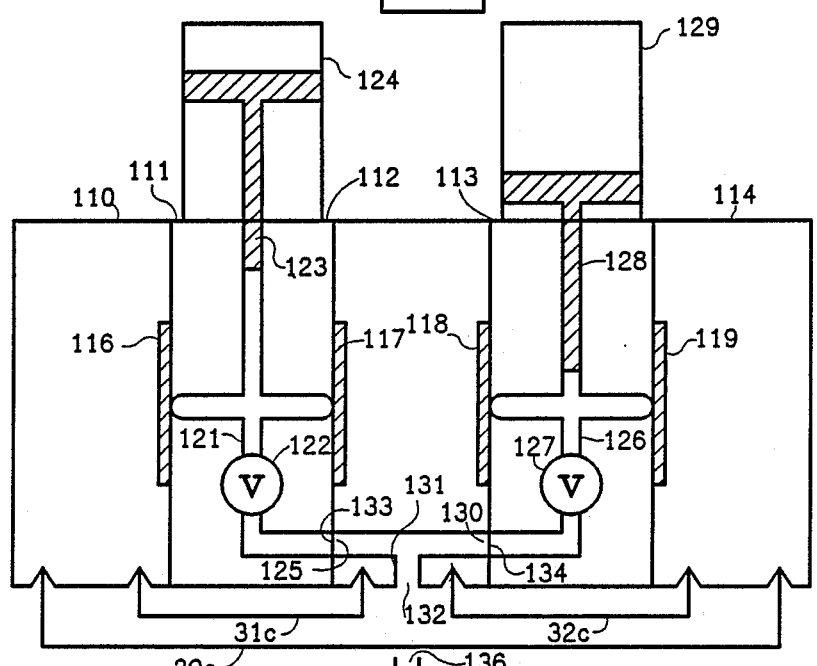
FIG. 4 is a diagram of a fourth preferred embodiment of the system of the present invention.

Referring to FIG. 4, a fourth preferred embodiment of the system of the stacked multi-parting injection molding system of the present invention includes a left molding block 110, a left center molding block 111, a center molding block 112, a right center molding block 113 and a right molding block 114, which are disposed for movement with respect to each other along a common axis. A left molding cavity 116 is defined between the left molding block 110 and the left center molding block 111. A left center molding cavity 117 is defined between the left center molding block 111 and the center molding block 112. A right center molding cavity 118 is defined between the center molding block 112 and the right center molding block 113. A right molding cavity is defined between the right center molding block 113 and the right molding blocks 114.

The left center molding block 111 contains a left bifurcated runner system 121 for feeding injected plastic material to the left molding cavity 116 and the left center molding cavity 117. A valve 122 within the left runner system 121 may be operated to confine injected plastic material within that portion of the left runner system 121 that communicates directly with the left molding cavity 116 and the left center molding cavity 117. A left packing element 123 positioned within the left runner system 121 may be moved in response to operation of a piston device 124 to hold pressurize the confined injected plastic material within that portion of the left runner system 121 that communicates directly with the left molding cavity 116 and the left center molding cavity 117. The left runner system 121 has a left inlet orifice 125.

The right center molding block 113 contains a right bifurcated runner system 126 for feeding injected plastic material to the right molding cavity 119 and the right center molding cavity 118. A valve 127 within the right runner system 126 may be operated to confine injected plastic material within that portion of the right runner system 126 that communicates directly with the right center molding cavity 118 and the right molding cavity A right packing element 128 positioned within the right runner system 126 may be moved in response to operation of a piston device 129 to hold pressurize the confined injected plastic material within that portion of the right runner system 126 that communicates directly with the right center molding cavity 118 and the right molding cavity 119. The right runner system 126 has a right inlet orifice 130.

The molding system of FIG. 4 further contains a clamping unit 29c, a left locking system 31c and a right locking system 32c, such as the clamping unit 29, the left locking system 31 and the right locking system 32 in the system of FIG. 1. In addition, the molding system of FIG. 4 further includes a plasticizing system 135.

The clamping unit is operated to move the left molding block 110 axially in relation to the right molding block 114 to provide collective axial clamping force on the left molding cavity 116, the left center molding cavity 117, the right center molding cavity 118 and the right molding cavity 119.

The left locking system 31c is applied to maintain the left molding cavity 116 and the left center molding cavity 117 in closed positions when the right center molding cavity 118 and right molding cavity 119 are in open positions.

The right locking system 32c is applied to maintain the right molding cavity 119 and the right center molding cavity 118 in closed positions when the left center molding cavity 117 and left molding cavity 116 are in open positions.

An adjustable feed system in the molding system of FIG. 4 is encompassed by a combination of the molding blocks 111, 112, 113 and the plasticizing system 135. The center molding block 112 contains a central bifurcated runner system 131 that extends from a central inlet orifice 132 to a left outlet orifice 133 and a right outlet orifice 134.

Injected plastic material is fed from an outlet orifice 136 of the plasticizing system 135 to the inlet orifice 125 of the left bifurcated runner system 121 and to the inlet orifice 130 of the right bifurcated runner system 126 via the central bifurcated central runner system 131.

In accordance with the hold pressure control and plastic material transfer method of the present invention, the stacked multi-parting injection molding system of FIG. 4 is operated as follows.

The left molding block 110 and the right molding block 114 are moved toward each other by relative axial movement to provide collective axial clamping force on the left molding cavity 116, the left center molding cavity 117, the right center molding cavity 18 and the right molding cavity 119 so that the center block left outlet orifice 133 contacts and seals against the left inlet orifice 125 of the left runner system 121 at a left contact position as shown in FIG. 4.

The left locking system 31c is applied to lock the left molding cavity 116 and the left center molding cavity 117 in closed positions, as shown in FIG. 4.

The valve 122 is opened and the feed system is adjusted to enable plastic material to be fed from the plasticizing system 135 through the left runner system 121 to the left and left center molding cavities 116, 117.

The plasticizing system 135 is held against the center molding block 122 so that the plasticizing system outlet orifice 136 contacts and seals against the inlet orifice 132 of the center molding block 122. The plasticizing system 135 is pressurized to inject plastic material into the left molding cavity 116 and the left center molding cavity 117 via the central bifurcated runner system 131.

The valve 122 is closed to confine the plastic material injected into the left runner system 121 and the left and left center molding cavities 116, 117 to thereby holdpressurize the plastic material confined in the left runner system 121 and the left and left center molding cavities 116, 117.

The left packing element 123 is moved to confine the plastic material injected into the left runner system 121 and the left and left center molding cavities 116, 117 and thereby holdpressurize the plastic material confined in the left runner system 121 and the left and left center molding cavities 116, 117. The left packing element 123 is moved again to further holdpressurize such plastic material as such plastic material cools. Subsequently, the left packing element 123 is moved to depressurize the plastic material confined in the left runner system 121.

The left and right molding blocks 110, 114 are then withdrawn from each other to open the right center and right molding cavities 118, 119 and eject molded products therefrom.

The left molding block 110 and the right molding block 114 are moved toward each other by relative axial movement to provide collective axial clamping force on the left molding cavity 116, the left center molding cavity 117, the right center molding cavity 18 and the right molding cavity 119 so that the center block right outlet orifice 134 contacts and seals against the right inlet orifice 130 of the right runner system 126 at a right contact position as shown in FIG. 4.

The right locking system 32c is applied to lock the right molding cavity 119 and the right center molding cavity 118 in closed positions, as shown in FIG. 4.

The valve 127 is opened and the feed system is adjusted to enable plastic material to be fed from the plasticizing system 135 through the right runner system 126 to the right and right center molding cavities 119, 118.

The plasticizing system 135 is held against the center molding block 122 so that the plasticizing system outlet orifice 136 contacts and seals against the inlet orifice 132 of the center molding block 122. The plasticizing system 135 is pressurized to inject plastic material into the right molding cavity 119 and the right center molding cavity 118 via the central bifurcated runner system 131.

The valve 127 is closed to confine the plastic material injected into the right runner system 126 and the right and right center molding cavities 119, 118 to thereby holdpressurize the plastic material confined in the right runner system 126 and the right and right center molding cavities 119, 118.

The right packing element 128 is moved to holdpressurize the plastic material confined in the right runner system 126 and the right and right center molding cavities 119, 118. The right packing element 128 is moved again to further holdpressurize such plastic material as such plastic material cools. Subsequently, the left packing element 128 is moved to depressurize the plastic material confined in the right runner system 126.

The left and right molding blocks 110, 114 are withdrawn from each other to open the left center and left molding cavities 116, 117 and eject molded products therefrom.

All of these embodiments may utilize conventional injection molding machinery in which the inlet orifices of the runner systems at some time during the molding cycle lose contact with the outlet orifice(s) of the plasticizing system.

The drawing shows the various embodiments as seen from above or from one side. The designation of particular components as left and right is an arbitrary designation solely for distinguishing such components. In practice such components may be positioned one above the other rather than in a left and right orientation.

Each parting line between adjacent molding parts may define multiple mold cavities. When multiple molding cavities are so defined the snorkels shown in FIGS. 1 and 2 can be more centrally located. Although the snorkels 67, 68 in the system of FIG. 2 are shown as widely separated for purpose of illustration, they may be positioned closer together.

In other embodiments of the present invention, more than five molding blocks may be axially aligned.

Additional valves may be provided within the feed system for special purposes, such as to prevent drooling of plastic material from the orifices when the molding blocks are separated.

These and other variations will be apparent in accordance with the present invention to those skilled in the art. For example, the four illustrated embodiments show four different types of hold pressure control systems and four different types of adjustable feed systems. Although, only four combinations of specific hold pressure control systems with adjustable transfer systems are shown and described, each of the hold pressure control systems can be combined with each of the adjustable systems in accordance with the present invention.

Although the embodiments shown in FIGS. 1 and 2 include snorkle systems leading to plasticizing systems located at the end of the injection molding machinery, and the embodiments of FIGS. 3 and 4 include inlet orifices leading to plasticizing systems located at the side or top of the injection molding machinery, it should be understood that the embodiments of FIGS. 1 and 2 alternatively may include inlet orifices leading to plasticizing systems located at the side or top of the injection molding machinery instead of or in combination with snorkle systems leading to plasticizing systems located at the end of the injection molding machinery, and that the embodiments of FIGS. 3 and 4 alternatively may include snorkle systems leading to plasticizing systems located at the end of the injection molding machinery instead of or in combination with inlet orifices located at the side or top of the injection molding machinery.

I claim:

1. A method of cyclic injection molding a plastic material by controlling hold pressure and transferring plastic material to molding cavities of a stacked multi-parting injection molding system having desynchronized injection periods, including left, left center, center, right center and right molding blocks disposed for movement with respect to each other along a common axis, and defining a left molding cavity between the left and the left center molding blocks, a left center molding cavity between the left center and the center molding blocks, a right center molding cavity between the center and the right center molding blocks, and a right molding cavity between the right center and the right molding blocks; wherein the left center molding block contains a left runner system with left confining means for confining injected plastic material in the left runner system, and with at least one left inlet orifice, for feeding the left and left center molding cavities; and wherein the right center molding block contains a right runner system with right confining means for confining injected plastic material in the right runner system, and with at least one right inlet orifice, for feeding the right center and right molding cavities; a clamping unit for moving axially the left molding block in relation to the right molding block and providing collective axial clamping force on the left, left center, right center and right molding cavities; a left locking system for maintaining the left and left center molding cavities in a closed position when the right center and right molding cavities are in an open position; a right locking system for maintaining the right center and right molding cavities in a closed position when the left and left center molding cavities are in an open position; and an adjustable feed system encompassed by at least a combination of the left center and the right center blocks and a plasticizing system which has one or more outlet orifices, the method comprising the cyclic steps of:

a. moving the left and right molding blocks toward each other by relative axial movement to provide collective axial clamping force on the left, left center, right center and right molding cavities, thereby positioning the left runner orifice in a predetermined left contact position;

b. applying the left locking system;

c. adjusting the feed system to enable the plastic material to be fed from the plasticizing system through the left runner system to the left and left center molding cavities;

d. pressurizing the plasticizing system to inject the plastic material into the left and left center molding cavities via the left runner system;

e. confining the plastic material injected into the left runner system and the left and left center molding cavities;

f. holdpressurizing the plastic material confined in the left runner system and the left and left center molding cavities;

g. withdrawing the left and right molding blocks from each other to open the right center and right molding cavities and eject molded products therefrom;

h. moving the left and right molding blocks toward each other by relative axial movement to provide collective axial clamping force on the left, left center, right center and right molding cavities, thereby positioning the right runner orifice in a predetermined right contact position;

i. applying the right locking system;

j. adjusting the feed system to enable the plastic material to be fed from the plasticizing system through the right runner system to the right center and right molding cavities;

k. pressurizing the plasticizing system to inject the plastic material into the right center and right molding cavities via the right runner system;

l. confining the plastic material injected into the right runner system and the right center and right molding cavities;

m. holdpressurizing the plastic material confined in the right runner system and the right center and right molding cavities;

n. withdrawing the left and right molding blocks from each other to open the left center and left molding cavities and eject molded products therefrom.

2. A method according to claim 1, wherein the molding system further includes left movable packing means for hold pressurizing the plastic material confined in the left runner system and left and left center molding cavities; and right movable packing means for hold pressurizing the plastic material confined in the right runner system and right center and right molding cavities, characterized by step (f) further comprising the step of (o) moving the left packing means to further hold pressurize the plastic material confined in the left runner system and left and left center molding cavities;

and by step (m) further comprising the step of (p) moving the right packing means to further hold pressurize the plastic material confined in the right runner system and the right center and right molding cavities.

3. A method according to claim 2, characterized by the method further comprising the steps of (q) moving the left packing means subsequent to step (o) to depressurize the plastic material confined in the left runner system;

(r) moving the right packing means subsequent to step (p) to depressurize the plastic material confined in the right runner system.

4. A method according to claim 1, wherein the left and right confining means are movable packing means, characterized by step (f) further comprising the step of (o) moving the left confining means to further hold pressurize the plastic material confined in the left runner system and the left and left center molding cavities;

and by step (m) further comprising the step of (p) moving the right confining means to further hold pressurize the plastic material confined in the right runner system and the right center and right molding cavities.

5. A method according to claim 1, wherein the injection molding system comprises a single plasticizing unit with a single outlet orifice, characterized by step (c) comprising the steps of (o) moving the plasticizing unit toward the left inlet orifice, so that the outlet orifice contacts and seals against the left inlet orifice at said left contact position;

and by step (j) comprising the step of (p) moving the plasticizing unit toward the right inlet orifice, so that the outlet orifice contacts and seals against the right inlet orifice at said right contact position.

6. A method according to claim 1, wherein the injection molding system comprises a plasticizing system with a left outlet orifice and a right outlet orifice, characterized by step (c) comprising the steps of (o) holding the plasticizing system against the left inlet orifice, so that the outlet orifice contacts and seals against the left inlet orifice at said left contact position;

and by step (j) comprising the step of (p) holding the plasticizing system against the right inlet orifice, so that the outlet orifice contacts and seals against the right inlet orifice at said right contact position.

7. A method according to claim 1, wherein the left and right confining means are movable packing means, and each comprise a one way valve, characterized by step (f) further comprising the step of (o) moving the left confining means to further hold pressurize the plastic material confined in the left runner system and the left and left center molding cavities;

and by step (m) further comprising the step of (p) moving the right confining means to further hold pressurize the plastic material confined in the right runner system and the right center and right molding cavities.

8. A method according to claim 1, wherein the center block provides a bifurcated flow system with a center block inlet orifice, a center block left outlet orifice and a center block right outlet orifice, and wherein the plasticizing system comprises an outlet orifice, characterized by step (c) comprising the steps of (o) moving the left and right molding blocks toward each other to provide collective axial clamping force on the stacked molding blocks, so that the center block left outlet orifice contacts and seals against the left inlet orifice at said left contact position;

(p) holding the plasticizing system against the center block inlet orifice, so that the outlet orifice of the plasticizing system contacts and seals against the left inlet orifice at said left contact position;

and by step (j) comprising the step of (q) moving the left and right molding blocks toward each other to provide collective axial clamping force on the stacked molding blocks, so that the center block right outlet orifice contacts and seals against the right inlet orifice at said right contact position;

(r) holding the plasticizing system against the center block inlet orifice, so that the outlet orifice of the plasticizing system contacts and seals against the right inlet orifice at said right contact position.

9. A method according to claim 1, wherein the left center molding block provides an outlet orifice, and wherein the plasticizing system comprises an outlet orifice, characterized by step (c) comprising the steps of (o) holding the plasticizing system against the left inlet orifice of the left molding block, so that the outlet orifice of the plasticizing system contacts and seals against said left inlet orifice at said left contact position;

and by step (j) comprising the step of (p) moving the left and right molding blocks toward each other to provide collective axial clamping force on the stacked molding blocks, so that the outlet orifice of the left center molding block contacts and seals against the right inlet orifice of the right center molding block at said contact position;

(q) holding the plasticizing system against the inlet orifice of the left center molding block inlet, so that the outlet orifice of the plasticizing system contacts and seals against the left inlet orifice at said left contact position.

10. A method according to claim 1, wherein the injection molding system comprises a left plasticizing unit with a left outlet orifice and a right plasticizing unit with a right outlet orifice, characterized by step (c) comprising the steps of (o) holding the plasticizing unit against the left inlet orifice, so that the outlet orifice contacts and seals against the left inlet orifice at said left contact position;

and by step (j) comprising the step of (p) holding the plasticizing unit against the right inlet orifice, so that the outlet orifice contacts and seals against the right inlet orifice at said right contact position.

11. A method of cyclic injection molding a plastic material by controlling hold pressure and transferring plastic material to molding cavities of a stacked multi-parting injection molding system having desynchronized injection periods, including left, left center, center, right center and right molding blocks disposed for movement with respect to each other along a common axis, and defining a left molding cavity between the left and the left center molding blocks, a left center molding cavity between the left center and the center molding blocks, a right center molding cavity between the center and the right center molding blocks, and a right molding cavity between the right center and the right molding blocks; wherein the left center molding block contains a left runner system with left confining means for confining injected plastic material in the left runner system, and with at least one left inlet orifice, for feeding the left and left center molding cavities; and wherein the right center molding block contains a right runner system with right confining means for confining injected plastic material in the right runner system, and with at least one right inlet orifice, for feeding the right center and right molding cavities; a clamping unit for moving axially the left molding block in relation to the right molding block and providing collective axial clamping force on the left, left center, right center and right molding cavities; a left locking system for maintaining the left and left center molding cavities in a closed position when the right center and right molding cavities are in an open position; a right locking system for maintaining the right center and right molding cavities in a closed position when the left and left center molding cavities are in an open position; and an adjustable feed system that includes at least a combination of the runner system and a plasticizing system which has one or more outlet orifices, and which is separated during a portion of the molding cycle by the plasticizing system being separated from the runner system, the method comprising the cyclic steps of:

a. moving the left and right molding blocks toward each other by relative axial movement to provide collective axial clamping force on the left, left center, right center and right molding cavities, thereby positioning the left runner orifice in a predetermined left contact position;

b. applying the left locking system;

c. adjusting the feed system to enable the plastic material to be fed from the plasticizing system through the left runner system to the left and left center molding cavities;

d. pressurizing the plasticizing system to inject the plastic material into the left and left center molding cavities via the left runner system;

e. confining the plastic material injected into the left runner system and the left and left center molding cavities;

f. holdpressurizing the plastic material confined in the left runner system and the left and left center molding cavities;

g. withdrawing the left and right molding blocks from each other to open the right center and right molding cavities and eject molded products therefrom;

h. moving the left and right molding blocks toward each other by relative axial movement to provide collective axial clamping force on the left, left center, right center and right molding cavities, thereby positioning the right runner orifice in a predetermined right contact position;

i. applying the right locking system;

j. adjusting the feed system to enable the plastic material to be fed from the plasticizing system through the right runner system to the right center and right molding cavities;

k. pressurizing the plasticizing system to inject the plastic material into the right center and right molding cavities via the right runner system;

l. confining the plastic material injected into the right runner system and the right center and right molding cavities;

m. holdpressurizing the plastic material confined in the right runner system and the right center and right molding cavities;

n. withdrawing the left and right molding blocks from each other to open the left center and left molding cavities and eject molded products therefrom; and o. separating the runner system from the plasticizing system at some time during the molding cycle.

12. A stacked multi-parting injection molding apparatus having desynchronized injection periods, comprising left, left center, center, right center and right molding blocks disposed for movement with respect to each other along a common axis, and defining a left molding cavity between the left and the left center molding blocks, a left center molding cavity between the left center and the center molding blocks, a right center molding cavity between the center and the right center molding blocks, and a right molding cavity between the right center and the right molding blocks;

wherein the left center molding block comprises a left runner system, left confining means for confining injected plastic material in the left runner system, means for hold pressurizing the plastic material confined in the left runner system and the left and left center molding cavities, and with at least one left inlet orifice, for feeding the left and left center molding cavities;

wherein the right center molding block comprises a right runner system, right confining means for confining injected plastic material in the right runner system, means for hold pressurizing the plastic material confined in the right runner system and the right and right center molding cavities, and with at least one right inlet orifice, for feeding the right center and right molding cavities;

a clamping unit for moving axially the left molding block in relation to the right molding block and providing collective axial clamping force on the left, left center, right center and right molding cavities;

a left locking system for maintaining the left and left center molding cavities in a closed position when the right center and right molding cavities are in an open position;

a right locking system for maintaining the right center and right molding cavities in a closed position when the left and left center molding cavities are in an open position; and an adjustable feed system encompassed by at least a combination of the left center and the right center blocks and a plasticizing system which has one or more outlet orifices, wherein the left and right molding blocks can be moved toward each other by relative axial movement to provide collective axial clamping force on the left, left center, right center and right molding cavities, to thereby position the left runner orifice in a predetermined left contact position;

wherein the feed system may be adjusted to enable the plastic material to be fed from the plasticizing system through the left runner system to the left and left center molding cavities;

wherein the plasticizing system may be pressurized to inject the plastic material into the left and left center molding cavities via the left runner system;

wherein the confining means may be operated to confine the plastic material injected into the left runner system and the left and left center molding cavities;

wherein the hold pressurizing means may be operated to holdpressurize the plastic material confined in the left runner system and the left and left center molding cavities;

wherein the left and right molding blocks may be withdrawn from each other to open the right center and right molding cavities and eject molded products therefrom;

wherein the left and right molding blocks may be moved toward each other by relative axial movement to provide collective axial clamping force on the left, left center, right center and right molding cavities, to thereby position the right runner orifice in a predetermined right contact position;

wherein the feed system may be adjusted to enable the plastic material to be fed from the plasticizing system through the right runner system to the right center and right molding cavities;

wherein the plasticizing system may be pressurized to inject the plastic material into the right center and right molding cavities via the right runner system;

wherein the confining means may be operated to confine the plastic material injected into the right runner system and the right center and right molding cavities;

wherein the hold pressurizing means may be operated to holdpressurize the plastic material confined in the right runner system and the right center and right molding cavities; and wherein the left and right molding blocks may be withdrawn from each other to open the left center and left molding cavities and eject molded products therefrom.

13. An apparatus according to claim 12, comprising movable packing means that can be moved to hold pressurize the plastic material confined in the left runner system and left and left center molding cavities; and right movable packing means that can be moved to hold pressurize the plastic material confined in the right runner system and right center and right molding cavities.

14. An apparatus according to claim 13, comprising means for moving the left packing means subsequent to hold pressurizing the material confined in the left runner system to depressurize the plastic material confined in the left runner system;

means for moving the right packing means subsequent to hold pressurizing the material confined in the right runner system to depressurize the plastic material confined in the right runner system.

15. An apparatus according to claim 12, wherein the left confining means is a movable packing means that can be moved to further hold pressurize the plastic material confined in the left runner system and the left and left center molding cavities; and wherein the right confining means is a movable packing means that can be moved to further hold pressurize the plastic material confined in the right runner system and the right center and right molding cavities.

16. An apparatus according to claim 12, wherein the injection molding system comprises a single plasticizing unit with a single outlet orifice that can be moved toward the left inlet orifice, so that the outlet orifice contacts and seals against the left inlet orifice at said left contact position; and that can be moved toward the right inlet orifice, so that the outlet orifice contacts and seals against the right inlet orifice at said right contact position.

17. An apparatus according to claim 12, wherein the injection molding system comprises a plasticizing system with a left outlet orifice and a right outlet orifice, wherein the plasticizing system can be held against the left inlet orifice, so that the outlet orifice contacts and seals against the left inlet orifice at said left contact position; and held against the right inlet orifice, so that the outlet orifice contacts and seals against the right inlet orifice at said right contact position.

18. An apparatus according to claim 12, wherein the left and right confining means are movable packing means and each comprise a one way valve, wherein the left confining means may be moved to further hold pressurize the plastic material confined in the left runner system and the left and left center molding cavities; and wherein the right confining means may be moved to further hold pressurize the plastic material confined in the right runner system and the right center and right molding cavities.

19. An apparatus according to claim 12, wherein the center block provides a bifurcated flow system with a center block inlet orifice, a center block left outlet orifice and a center block right outlet orifice, and wherein the plasticizing system comprises an outlet orifice, wherein when the left and right molding blocks are moved toward each other to provide collective axial clamping force on the stacked molding blocks so that the center block left outlet orifice contacts and seals against the left inlet orifice at said left contact position, so that when the plasticizing system is held against the center block inlet orifice, the outlet orifice of the plasticizing system contacts and seals against the left inlet orifice at said left contact position; and wherein when the left and right molding blocks are moved toward each other to provide collective axial clamping force on the stacked molding blocks so that the center block right outlet orifice contacts and seals against the right inlet orifice at said right contact position, so that when the plasticizing system is held against the center block inlet orifice, so that the outlet orifice of the plasticizing system contacts and seals against the right inlet orifice at said left contact position.

20. An apparatus according to claim 12, wherein the left center molding block provides an outlet orifice, and wherein the plasticizing system comprises an outlet orifice, wherein when the plasticizing system is held against the left inlet orifice of the left molding block, the outlet orifice of the plasticizing system contacts and seals against said left inlet orifice at said left contact position; and wherein when the left and right molding blocks are moved toward each other to provide collective axial clamping force on the stacked molding blocks so that the outlet orifice of the left center molding block contacts and seals against the right inlet orifice of the right center molding block at said contact position, so that when the plasticizing system is held against the inlet orifice of the left center molding block inlet, the outlet orifice of the plasticizing system contacts and seals against the left inlet orifice at said left contact position.

21. An apparatus according to claim 12, wherein the injection molding system comprises a left plasticizing unit with a left outlet orifice and a right plasticizing unit with a right outlet orifice, wherein when the plasticizing unit is held against the left inlet orifice, the outlet orifice contacts and seals against the left inlet orifice at said left contact position; and wherein when the plasticizing unit is held against the right inlet orifice, the outlet orifice contacts and seals against the right inlet orifice at said right contact position.

22. A stacked multi-parting injection molding apparatus having desynchronized injection periods, comprising left, left center, center, right center and right molding blocks disposed for movement with respect to each other along a common axis, and defining a left molding cavity between the left and the left center molding blocks, a left center molding cavity between the left center and the center molding blocks, a right center molding cavity between the center and the right center molding blocks, and a right molding cavity between the right center and the right molding blocks, and a runner system including a left runner system and a right runner system;

wherein the left center molding block comprises the left runner system, left confining means for confining injected plastic material in the left runner system, means for hold pressurizing the plastic material confined in the left runner system and the left and left center molding cavities, and with at least one left inlet orifice, for feeding the left and left center molding cavities;

wherein the right center molding block comprises the right runner system, right confining means for confining injected plastic material in the right runner system, means for hold pressurizing the plastic material confined in the right runner system and the right and right center molding cavities, and with at least one right inlet orifice, for feeding the right center and right molding cavities;

a clamping unit for moving axially the left molding block in relation to the right molding block and providing collective axial clamping force on the left, left center, right center and right molding cavities;

a left locking system for maintaining the left and left center molding cavities in a closed position when the right center and right molding cavities are in an open position;

a right locking system for maintaining the right center and right molding cavities in a closed position when the left and left center molding cavities are in an open position; and an adjustable feed system that includes at least a combination of the runner system and a plasticizing system which has one or more outlet orifices, and which is separated during a portion of the molding cycle by the plasticizing system being separated from the runner system;

wherein the left and right molding blocks can be moved toward each other by relative axial movement to provide collective axial clamping force on the left, left center, right center and right molding cavities, to thereby position the left runner orifice in a predetermined left contact position;

wherein the feed system may be adjusted to enable the plastic material to be fed from the plasticizing system through the left runner system to the left and left center molding cavities;

wherein the plasticizing system may be pressurized to inject the plastic material into the left and left center molding cavities via the left runner system;

wherein the confining means may be operated to confine the plastic material injected into the left runner system and the left and left center molding cavities;

wherein the hold pressurizing means may be operated to holdpressurize the plastic material confined in the left runner system and the left and left center molding cavities;

wherein the left and right molding blocks may be withdrawn from each other to open the right center and right molding cavities and eject molded products therefrom;

wherein the left and right molding blocks may be moved toward each other by relative axial movement to provide collective axial clamping force on the left, left center, right center and right molding cavities, to thereby position the right runner orifice in a predetermined right contact position;

wherein the feed system may be adjusted to enable the plastic material to be fed from the plasticizing system through the right runner system to the right center and right molding cavities;

wherein the plasticizing system may be pressurized to inject the plastic material into the right center and right molding cavities via the right runner system;

wherein the confining means may be operated to confine the plastic material injected into the right runner system and the right center and right molding cavities;

wherein the hold pressurizing means may be operated to holdpressurize the plastic material confined in the right runner system and the right center and right molding cavities; and wherein the left and right molding blocks may be withdrawn from each other to open the left center and left molding cavities and eject molded products therefrom; and wherein the runner system may be separated from the plasticizing system at some time during the molding cycle.

* * * * *